United States Patent [19]

Kiya et al.

[11] Patent Number: 4,794,311

[45] Date of Patent: Dec. 27, 1988

[54] NUMERICAL CONTROL SYSTEM

[75] Inventors: Nobuyuki Kiya, Hachiouji; Motoaki Yoshino, Suginami, both of Japan

[73] Assignee: Fanuc Ltd., Yamanashi, Japan

[21] Appl. No.: 936,941

[22] Filed: Dec. 1, 1986

Related U.S. Application Data

[63] Continuation of Ser. No. 705,340, filed as PCT JP84/00282 on Jun. 1, 1984 published as WO84/04978 on Dec. 20, 1984, abandoned.

[30] Foreign Application Priority Data

Jun. 6, 1983 [JP] Japan .................. 58-99412

[51] Int. Cl.$^4$ ............................................. G05B 19/18
[52] U.S. Cl. ...................................... 318/569; 318/593
[58] Field of Search ............... 318/593, 569, 632, 571

[56] References Cited

U.S. PATENT DOCUMENTS

| | | | |
|---|---|---|---|
| 3,430,036 | 2/1969 | Patrick | 318/569 |
| 3,835,360 | 9/1974 | Kiwiet | 318/571 X |
| 3,995,206 | 11/1976 | Aronstein | 318/593 |
| 4,011,437 | 3/1977 | Hohn | 318/568 |
| 4,099,113 | 7/1978 | Hayashi | 318/632 |
| 4,118,660 | 10/1978 | Ohtsuki | 318/571 |
| 4,478,009 | 10/1984 | Rukavina | 318/571 X |
| 4,513,234 | 4/1985 | Nozawa | 318/593 X |

Primary Examiner—Bentsu Ro
Attorney, Agent, or Firm—Staas & Halsey

[57] ABSTRACT

In a numerical control system for a machine tool using a general-purpose motor (11) in place of at least one of servo motors, a current position of a spindle (10) driven by the general-purpose motor (11) is detected (14, 9) and is compared with a position designated by a numerical control program. When the current position approaches the position designated by the numerical control program, brake signals (MBR, $\overline{BR}$) are generated to brake the general-purpose motor (11) or the like, and a rotation signal (MCW, MCCW) of the general-purpose motor (11) is disabled, thereby stopping the general-purpose motor (11) so as to cause the spindle (10) to stop at the position designated by the numerical control program.

2 Claims, 5 Drawing Sheets

NUMERICAL CONTROL SYSTEM

This is a continuation of co-pending application Ser. No. 705,340, filed as PCT JP84/00282 on Jun. 1, 1984, published as wd84/04978 on Dec. 20, 1984, now abandoned.

TECHNICAL FIELD

The present invention relates to a numerical control system for a machine tool or the like utilizing a general-purpose motor for performing indexing along any axis.

BACKGROUND ART

A conventional numerical control system for a mmachine tool or the like operates such that a pulse train is generated from a numerical control unit to drive a servo circuit, and servo motors such as pulse motors, DC motors or hydraulic motors are driven to move corresponding components or workpieces along respective axes in the machine tool or the like. However, servo and pulse motors are relatively expensive. Therefore, the overall cost of the system is increased when they are used.

However, some NC machining operations controlled by a numerical control unit do not require very high precision. For example, when a through hole is formed in a workpiece, high precision is required to index the tool with respect to the workpiece along X- and Y-axes. However, a displacement along the Z-axis need not be precisely determined since only a tip of the drill must reach through the lower surface of the workpiece so as to form the through hole.

SUMMARY OF INVENTION

It is an object of the present invention to eliminate the drawbacks of the conventional numerical control apparatus and to provide a low-cost numerical control system wherein a servo motor is used for indexing along an axis which requires high precision indexing in the same manner as the conventional numerical control apparatus, a general-purpose motor is used for performing indexing along an axis which does not require high precision indexing, and a conventional NC program for the servo motors can be used.

It is another object of the present invention to provide a numerical control system wherein an optimal displacement can be achieved by a general-purpose motor without being influenced by a size and an inertial force caused by the general-purpose motor along the corresponding axis.

It is still another object of the present invention to provide a numerical control system wherein displacement errors in indexing along an axis by the general-purpose motor will not be accumulated.

In order to achieve the above objects of the present invention, there is provided a numerical control system wherein a general-purpose motor is used in place of a pulse or servo motor for performing indexing along at least one axis which does not require high precision indexing, a current position along this axis is detected by a position detecting means, the general-purpose motor is driven and a brake mechanism is actuated to cause it to decelerate when the current position approaches a position designated by a program position instruction value, and is then stopped to achieve indexing. Timing signals for actuating the brake mechanism and stopping the general-purpose motor can be manually set as parameters in accordance with a size of a machine tool or the like. A positional error corresponding to the difference between the position designated for each block of the program and the actual position is used as an error correction signal representing a displacement to be made in the next block of the program. The error correction signal is supplied to the general-purpose motor, thereby eliminating the positional error.

The numerical control system according to the present invention is lower in cost than a conventional system. Furthermore, the numerical control system of the present invention can be used irrespective of the size of the numerically controlled machine tool. An error corresponding to the difference between the position designated by the program instruction and the actual position can be constantly fed back to the general-purpose motor and used to adjust the next position instruction to be fed to the general-purpose motor. Therefore, positional errors are not accumulated, and the low-cost general-purpose motor can be used, thereby providing the low-cost numerical control system.

DETAILED DESCRIPTION OF THE PREFERRED EMBODIMENT

The present invention will be described in detail with reference to the accompanying drawings.

A numerical control system for a machine tool will be described wherein indexing along the X- and Y-axes requires high precision and indexing along the Z-axis does not require high precision.

Figure 1:
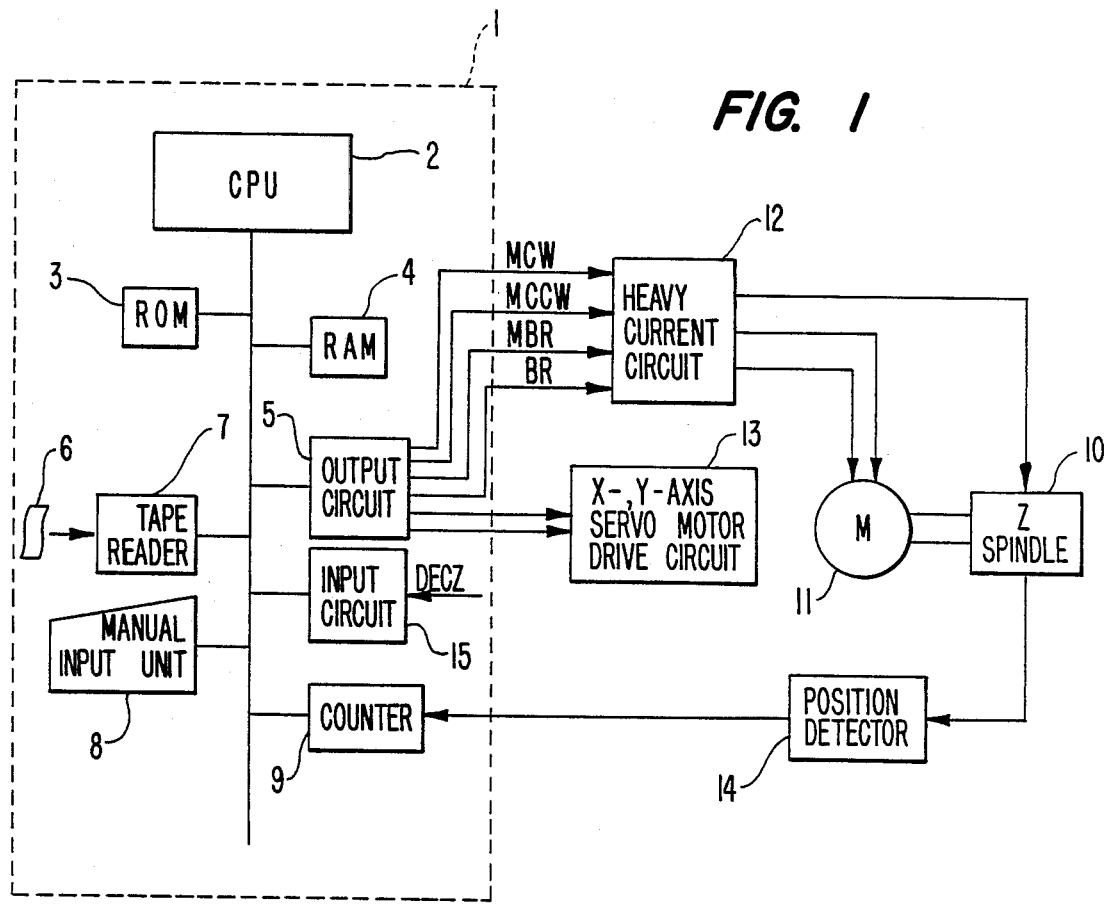
FIG. 1 is a block diagram of a numerical control system according to an embodiment of the present invention.

FIG. 1 is a block diagram of a numerical control system according to an embodiment of the present invention. Referring to FIG. 1, reference numeral 1 denotes a numerical control unit; 2, a central processing unit (CPU); 3, a ROM for storing a control program for controlling the overall operation of the system; 4, a RAM used for arithmetic operations; 5, an output circuit for generating a displacement signal to drive corresponding motors for performing indexing along the respective axes; 6, a tape for storing an NC machining pogram; and 7, a tape reader. A memory for storing the NC machining program may be used in place of the tape 6 and the tape reader 7. Reference numeral 8 denotes a manual input unit for entering parameters to be described later; 9, a counter; and 10, a Z spindle whose axis (in this embodiment) represents an axis which is not subjected to high precisoon indexing in the machine tool. Reference numeral 11 denotes a general-purpose motor for driving the Z spindle; and 12, a heavy current circuit for receiving the ON/OFF signal from the numerical control unit 1 to control braking of the general-purpose motor 11 and the Z spindle 10. Reference numeral 13 denotes a servo motor drive circuit for driving servo motors for performing indexing along axes (X- and Y-axes in this embodmment) which require high-precision indexing. The X and Y servo motors are driven in response to outputs from the servo motor drive circuit so as to perform indexing in the same manner as in the conventional numerical control system. Reference numeral 14 denotes a position detector such as a pulse coder for detecting a position of the Z spindle 10. An output from the pulse coder 14 is supplied to the counter 9. Reference numeral 15 denotes an input circuit for receivigg a signal sent from the machine tool.

The operation of the numerical control system according to this embodiment will be described. Numerical control for the X- and Y-axes is the same as that of the conventional numerical control, and a description thereof will be omitted. Only Z spindle control by the general-purpose motor 11 will be described hereinafter.

Figure 2:
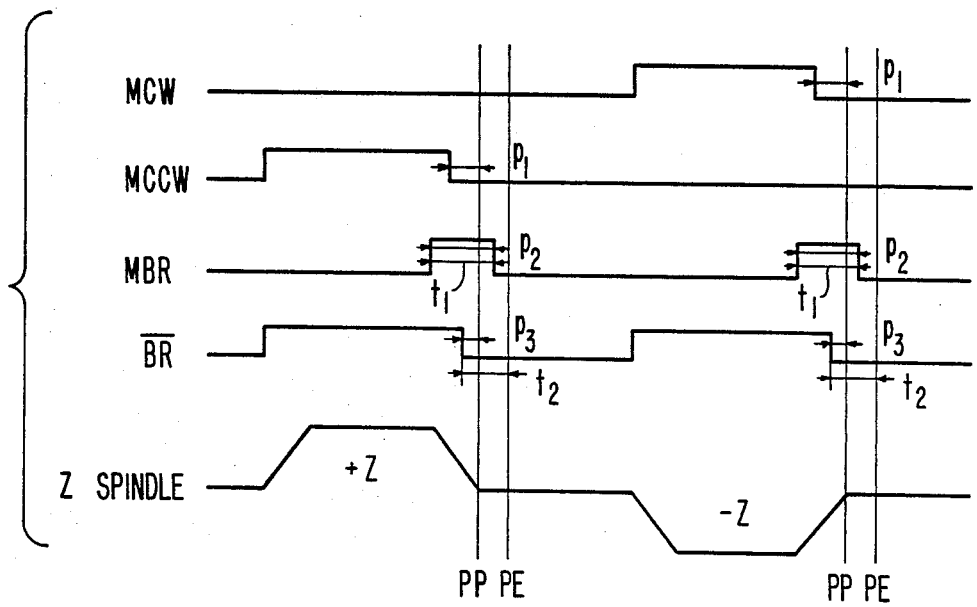
FIG. 2 is a timing chart for explaining automatic operation of the system shown in FIG. 1.

FIG. 2 is a timing chart for explaining normal automatic operation. Reference symbols MCW, MCCW, MBR and $\overline{BR}$ denote signals generated from the output circuit 5 in the numerical control unit. More particularly, the signals MCW and MCCW are respectively used for driving the general purpose motor 11 clockwise and counterclockwise. The signal MBR is a motor dynamic brake signal. The brake on the Z spindle is released when the signal $\overline{BR}$ is set at H level. Reference symbols $P_1$ to $P_3$ and $t_1$ and $t_2$ denote parameters set at the manual input unit 8. The respective parameters are set with respect to an inertial force in accordance with sizes of the general-purpose motor and the Z spindle. Reference symbol PP denotes a position instruction value designated by the program; PE, an indexing end position. The timing chart of FIG. 2 shows the operation of the Z spindle.

The operation of the numerical control system will be described with reference to the timing chart, the diagram in FIG. 1, and the flow chart of FIG. 3 which represents automatic operation.

Figure 3:
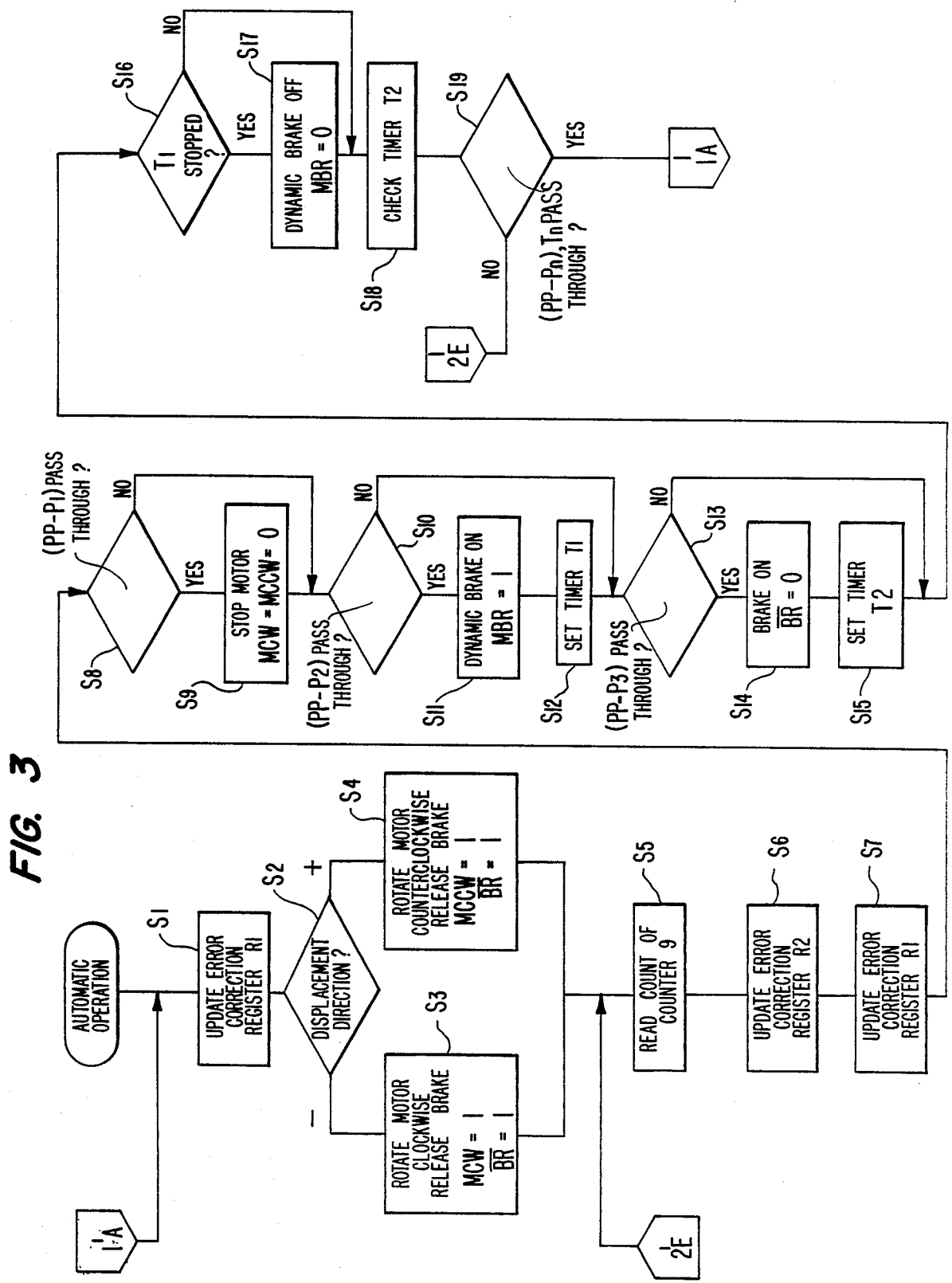
FIG. 3 is a flow chart for explaining the automatic operation of the system in FIG. 1.

Referring to FIG. 3, one block of the program is read by the CPU 2 through the tape reader 7. The designated position of the Z spindle is added to a value of an error correction register R1 (since the value of the error correction register R is "0" in the initialization mode, the error correction register R only stores the designated pssition of the Z spindle) (step S1). The CPU 2 then checks in step S2 whether the displacement direction is positive or negative. When the CPU 2 determines that the displacement direction is positive, the signal MCCW is supplied from the output circuit 5 to the heavy current circuit 12 to rotate the general-purpose motor 11 counterclockwise. However, when the CPU 2 determines in step S2 that the displacement direction is negative, the signal MCW is supplied to the motor 11 causing it to rotate clockwise, and at the same time, the brake signal $\overline{BR}$ is set at H level ($\overline{BR}=1$), thereby releasing the brake on the Z spindle (steps S3 and S4) (see FIG. 2). The motor 11 then rotates the Z spindle. The position detector 14 detects rotation of the Z spindle and generates a pulse. This pulse is counted by the counter 9. The CPU 2 reads the count of the counter 9 and updates the respective registers at each time interval (e.g., for every 8 msec). When the count of the counter 9 is read (step S5), the count is added to the value of a current position register $R_2$ (step S6). The current position register $R_2$ is used to display the current position on a display unit when the operator wishes to know the current position of the Z spindle. The count of the counter 9 is subtracted from the value of the error correction register $R_1$, and a resultant value is stored in the error correction register $R_1$. The CPU 2 checks in step S8 whether or not the value of the error correction register $R_1$ is equal to or smaller than the value of the parameter $P_1$ derived from the designated position PP, that is, whether or not the Z spindle has passed through point ($PP-P_1$) of FIG. 2. The CPU 2 also checks in step S10 whether or not the Z spindle has passed through point ($PP-P_2$) set by the parameter $P_2$. The CPU 2 similarly checks in step S13 whether or not the Z spindle has passed through point ($PP-P_3$) set by the parameter $P_3$. Thereafter, the operation in steps S16 to S19 (to be described later) in FIG. 3 is performed, and the operation after step S5 in FIG. 3 is performed. In this manner, the count of the counter 9 is read at each predetermined time interval to update the registers $R_1$ and $R_2$. When the value of the error correction register $R_1$ is smaller than values ($PP-P_1$), ($PP-P_2$) and ($PP-P_3$) obtained by subtracting the parameters $P_1$, $P_2$ and $P_3$ from the designated position PP, the next operations are performed.

More particularly, as is apparent from the timing chart of FIG. 2, when the value of the error correction register $R_1$ is smaller than the value ($PP-P_2$) (step S10) (it should be noted that the parameters $P_1$, $P_2$ and $P_3$ are determined in accordance with sizes or the like of the general-purpose motor 11 and the Z spindle, so the parameter $P_2$ is not always the largest), the CPU 2 causes the output circuit 5 to generate the motor dynamic brake signal MBR (step S11), thereby starting braking of the motor 11 (see FIG. 2). The parameter $t_1$ is set in the timer $T_1$, and the timer $T_1$ is started (step S12). When the motor 11 is decelerated and the Z spindle passes through the point ($PP-P_1$) (step S8), the counterclockwise or clockwise motor rotation signal MCCW or MCW is disabled, thereby stopping the motor 11 (step S9). Finally, when the Z spindle passes through the point ($PP-P_3$) (step S13), the brake signal $\overline{BR}$ is set at L level to brake the Z spindle (step S14). At the same time, the parameter $t_2$ is set in the timer $T_2$, and the timer $T_2$ is started (step S15). When the timer $T_1$ is stopped (step S18), the output circuit stops generating the motor dynamic brake signal MBR. When the timer $T_2$ is stopped and the Z spindle has passed through all the points ($PP-P_1$) to ($PP-P_3$) set by the parameters $P_1$, $P_2$ and $P_3$, and the times $t_1$ and $t_2$ set in the timers $T_1$ and $T_2$ have elapsed (step S19), the operation is started from step S1 again. It should be noted that since the values $t_1$ and $t_2$ of the timers $T_1$ and $T_2$ are set as parameters, one of the values $t_1$ and $t_2$ is set to be larger than the other in accordance with the characteristics of the machine tool, so that the CPU 2 must check in step S19 whether or not both the timers $T_1$ and $T_2$ are stopped. When the Z spindle has reached the position designated by one block of the program, indexing is completed. However, since the general-purpose motor 11 is used to index the Z spindle in the designated position, the Z spindle may not be properly fed to the designated position PP and is therefore susceptible to overshooting or undershooting. A difference between the current position of the Z spindle and the designated position is stored as an error in the error correction register $R_1$. When an incremental instruction is generated in the next block of the program, the error is added to constitute the next error correction value stored in the error correction register $R_1$ (step S1). For example, when the Z spindle overshoots by a value represented by +Q, an overshooting value +Q is counted by the counter 9. The value $+Q$ is subtracted from the value of the error correction register $R_1$. When the updated incremental instruction PP is added to the subtracted result, the value of the error correction register $R_1$ is $PP-Q$. In other words, the overshooting value $+Q$ can be corrected to represent the proper instruction. This error correction value represents a displacement up to the designated position PP. The operation between steps S2 and S19 is performed with respect to the value (the designated position PP) of the register $R_1$. In this case, the motor is dynamically braked at a position corresponding to a value $PP-P_2$. The general-purpose motor is stopped at a position corresponding to a value $PP-P_1$. The Z spindle 10 is braked at a position corresponding to a value $PP-P_3$. When the periods set by the timers $T_1$ and $T_2$ have elapsed, the dynamic braking on the motor 11 is released. The CPU 2 determines that indexing is completed (2PE in FIG. 2). The next block instruction is added to the value of the error correction register $R_1$ (step S1).

The numerical control system of the present invention is operated in the manner described above. The Z spindle can be driven by the general-purpose motor 11 in such a manner that errors between the actual positions and the designated program positions are not accumulated, and where an error generated by each displacement is corrected in the next designated position instruction so that the Z spindle is driven in accordance with a corrected instruction. As a result, the errors will not be accumulated, and olly a small total error of the Z spindle is obtained.

The operation of automatic zero point return will be described hereinafter.

Figure 4:
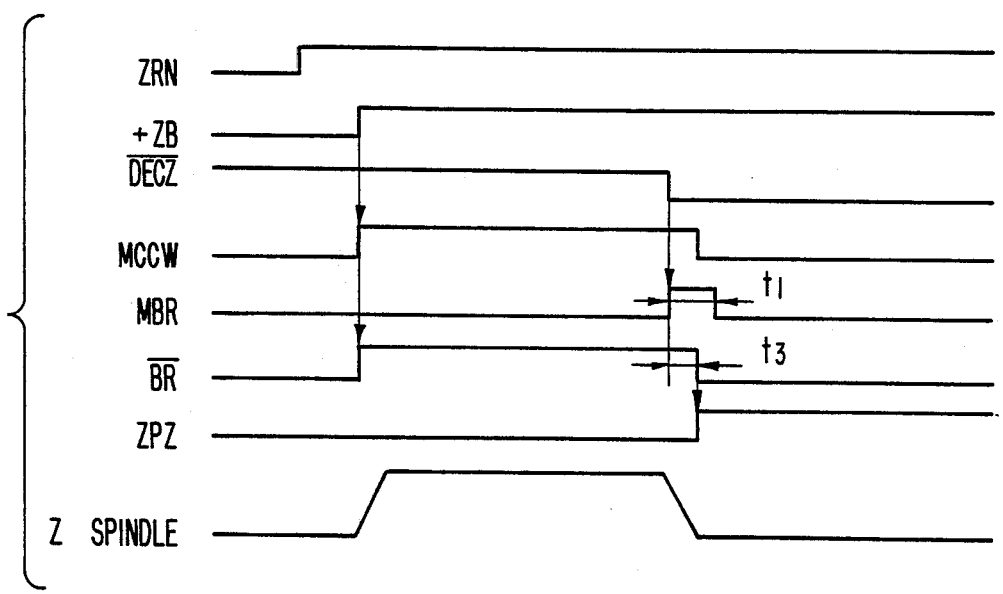
FIG. 4 is a timing chart for explaining automatic zero point of the system in FIG. 1.
Figure 5:
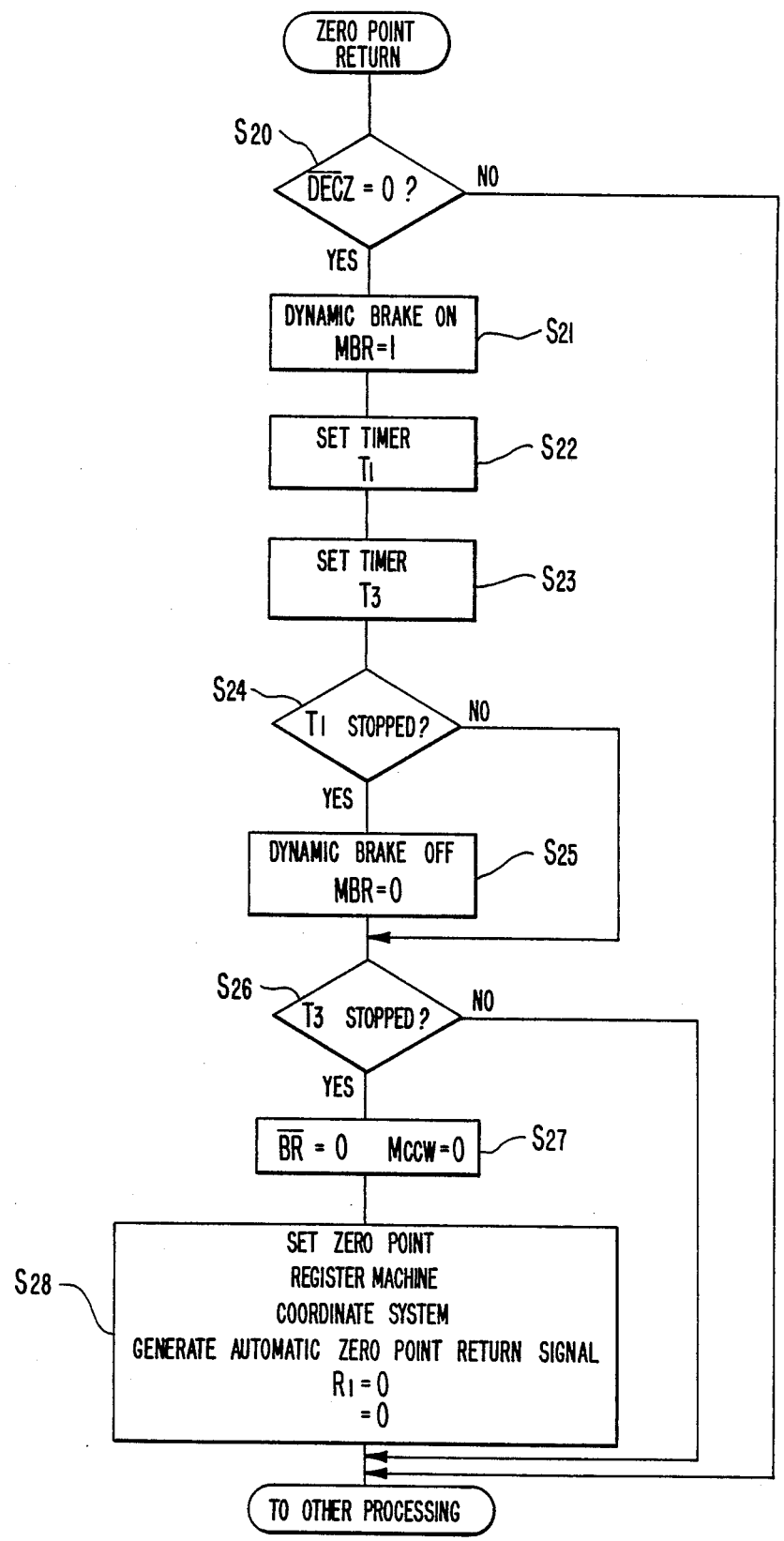
FIG. 5 is a flow chart for explaining the automatic zero point return.

FIG. 4 is a timing chart for explaining the automatic zero point return, and FIG. 5 is a flow chart thereof. When a Z-axis zero point switch ZRN and a Z-axis positive direction drive switch +ZB are sequentially operated, the CPU 2 causes the output circuit 5 to supply the motor counterclockwise rotation signal MCCW to the motor 11. The brake signal $\overline{BR}$ is then set at H level. The brake on the Z spindle is released, and the Z spindle is moved (FIG. 4). A Z-axis limit switch DECZ is actuated when the Z spindle comes closer to the origin. A deceleration signal $\overline{DECZ}$ which is an inverted signal of the signal from the switch DECZ is set at logic "0" (step S20), and the motor dynamic brake signal MBR is generated to brake the motor 11 (step S21). The Z spindle is decelerated, and the parameters $t_1$ and $t_3$ are set in the timer $T_1$ and a timer $T_3$ (steps S22 and S23). Thereafter, when the timer $T_3$ is stopped, the motor counterclockwise rotation signal MCCW is set at logic "0" to stop driving the motor 11, and the brake signal $\overline{BR}$ is set at L level to brake the Z spindle (steps S26 and S27). When the timer $T_1$ is stopped, the motor dynamic brake signal MBR is set at logic "0" to release the brake on the motor 11 (steps S24 and S25). The automatic zero point return signal PPZ is generated (FIG. 4), and the machine coordinate system is set at "0". The content of the error correction register $R_1$ is also set at "0" (step S28).

The JOG feed operation will be described hereinafter.

Figure 6:
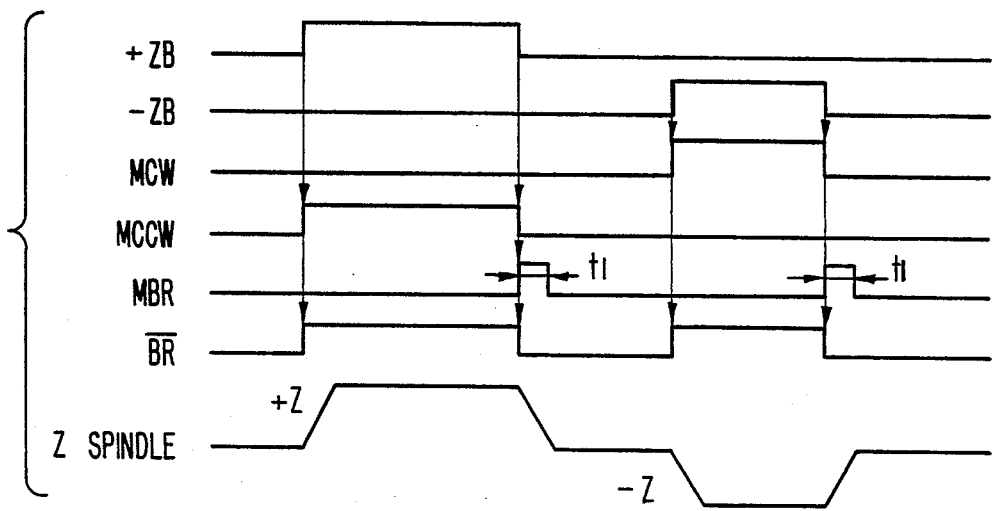
FIG. 6 is a timing chart for explaining JOG feed of the system in FIG. 1.
Figure 7:
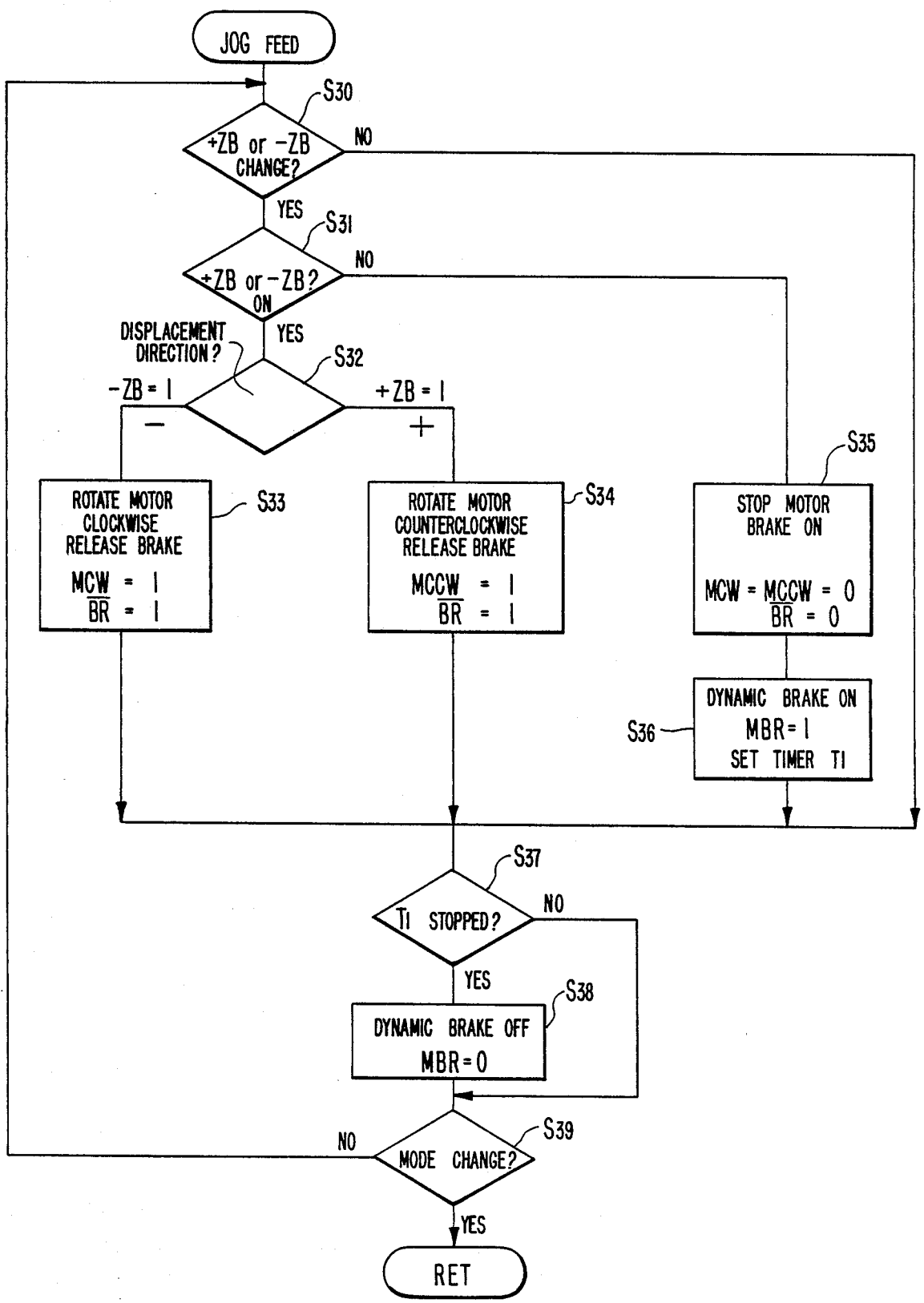
FIG. 7 is a flow chart for explaining the JOG feed of the system in FIG. 1.

FIG. 6 is a timing chart for explaining the JOG feed, and FIG. 7 is a flow chart thereof. When a Z-axis positive or negative manual feed button +ZB or −ZB is depressed in the JOG feed mode to positively or negatively feed the Z spindle (steps S30, S31 and S32), the motor clockwise or counterclockwise rotation signal MCW or MCCW is generated, and the brake signal $\overline{BR}$ is set at H level. The brake on the Z spindle is released, and the motor 11 is rotated clockwise or counterclockwise (steps S33 and S34) (see FIG. 6). When the manual button +ZB or −ZB is continuously depressed, the CPU 2 repeats steps S30, S37 and S39 of FIG. 7 so a to continuously rotate the motor clockwise or counterclockwise.

When the manual feed button +ZB or −ZB is released (steps S30 and S31), the motor 11 is stopped (the motor clockwis rotation signal MCW=MCCW=0), the Z spindle is braked (the brake signal $\overline{BR}$=0), and the motor dynamic brake is actuated (the motor dynamic brake signal MBR=1) (FIG. 6). The parameter $t_1$ is set in the timer $T_1$, and the timer $T_1$ is started (steps S35 and S36). When the rotational speed of the Z spindle 10 is decreased and the timer $T_1$ is stopped (step S37), the motor dynamic brake is released (step S38) and the Z spindle is stopped. While key input operation is being performed in the JOG mode, the CPU 2 monitors changes in the manual feed buttons +ZB and −ZB at each predetermined interval (step S30). However, when the JOG mode is cancelled, the next processing is initiated (step S39).

When a reset switch or an emergency switch is turned on, the motor rotation signal MCW or MCCW is disabled, and the brake signal BR is set at logic "0". The Z spindle 10 is braked, and the motor dynamic brake signal MBR is generated for a period given by the parameter $t_2$. As a result, the motor 11 is braked.

In the above embodiment, the axis which does not require high precision indexing is exemplified by a Z spindle driven by the general-purpose motor, while the servo motors are used for indexing along the X- and Y-axes in the same manner as the conventional case. However, if there is any other axis which does not require high precision indexing, the present invention can be applied to such an axis. The number of such axes can be two or three.

A spindle motor may be used in place of the general-purpose indexing motor.

We claim:

1. A numerical control system for a machine tool having a movable element, for controlling drive motors in accordance with a numerical control program including desired stopping position data and a series of blocks each containing a position instruction, comprising:
general-purpose motor means for driving the movable element of the machine tool in response to first control signals, said general-purpose motor means being used as at least one of the drive motors for indexing the movable element along a first axis which does not require high precision indexing;
servo motor means for driving the movable element in response to second control signals, said servo motor means being used as at least one of the drive motors for indexing the movable element along a second axis which requires high precision indexing;
position detecting means for detecting movement of the movable element along the first axis and for providing movement data, indicative of a current position of the movable element, responsive to the detected movement;
means for correcting the position instruction contained in each block in accordance with an error between the position instruction in a preceding block and the movement data and for providing position data for each of the blocks responsive to the error;

error menas for receiving and storing as stored data, the desired stopping position data, for repetitively updating the stored data in dependence upon the movement data during execution of numerical control associated with the first axis and for providing a combination signal responsive to the updating;

means, responsive to the combination signal, for providing the first control signals for the general-purpose motor; and braking means for braking the general-purpose motor means when the current position approaches a position defined by the desired stopping position data and so that said movable element is stopped at the position defined by the desired stopping position data.

2. A system according to claim 1, further comprising:

timing means for controlling a brake time at which the combination signal initiates braking of the general-purpose motor means via said braking means such that the desired stopping position data also defines the brake time.

* * * * *